(12) United States Patent
Sato et al.

(10) Patent No.: US 11,264,678 B2
(45) Date of Patent: Mar. 1, 2022

(54) BATTERY WIRING MODULE WITH PARTITION WALL SEPARATING MODULE-SIDE TERMINAL AND ELECTRIC WIRE PASSING ABOVE PARTITION WALL

(71) Applicant: SUMITOMO WIRING SYSTEMS, LTD., Mie (JP)

(72) Inventors: Hiroshi Sato, Mie (JP); Ryota Mori, Mie (JP); Hisayoshi Yaita, Mie (JP); Masami Suzuki, Mie (JP); Kenta Sawai, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 281 days.

(21) Appl. No.: 16/540,273

(22) Filed: Aug. 14, 2019

(65) Prior Publication Data

US 2020/0075917 A1 Mar. 5, 2020

(30) Foreign Application Priority Data

Aug. 29, 2018 (JP) .............................. JP2018-160510

(51) Int. Cl.
*H01M 50/502* (2021.01)
*H01M 50/20* (2021.01)
*H01M 50/543* (2021.01)

(52) U.S. Cl.
CPC ......... *H01M 50/502* (2021.01); *H01M 50/20* (2021.01); *H01M 50/543* (2021.01); *H01M 2220/20* (2013.01)

(58) Field of Classification Search
CPC .. H01M 50/502; H01M 50/20; H01M 50/543; H01M 2220/20; H01M 50/572; Y02E 60/10
See application file for complete search history.

(56) References Cited

U.S. PATENT DOCUMENTS

2014/0158396 A1 6/2014 Nakayama
2019/0334152 A1* 10/2019 Shimizu ................ H01M 50/20

FOREIGN PATENT DOCUMENTS

JP 2013-037988 2/2013
WO WO 2016/047477 A1 * 3/2016 ............ H01G 11/76

OTHER PUBLICATIONS

Machine translation of WO 2016/047477A1, Fujita et al., 2016 (Year: 2016).*

* cited by examiner

*Primary Examiner* — Kwang Han
(74) *Attorney, Agent, or Firm* — Greenblum & Bernstein, P.L.C.

(57) ABSTRACT

Provided is a battery wiring module that can reduce damage of electric wires. The battery wiring module has: a module-side terminal electrically connected to a bus bar connecting battery terminals of a plurality of battery cells; an electric wire with one end side to which the module-side terminal is connected; and a housing for accommodating the electric wire and the module-side terminal. The housing has a terminal accommodating portion for accommodating the module-side terminal. The battery wiring module includes a partition wall portion that is provided such that the module-side terminal disposed on the bottom portion of the terminal accommodating portion is located between the partition wall portion and the bottom portion, and separates the module-side terminal and the electric wire.

7 Claims, 5 Drawing Sheets

BATTERY WIRING MODULE WITH PARTITION WALL SEPARATING MODULE-SIDE TERMINAL AND ELECTRIC WIRE PASSING ABOVE PARTITION WALL

TECHNICAL FIELD

The present invention relates to a battery wiring module.

BACKGROUND ART

As disclosed in JP 2013-37988A for example, in vehicles such as electric automobiles and hybrid automobiles, a high-voltage secondary battery, which is installed as a power supply for driving traveling, is provided with a battery wiring module. In the battery wiring module, module-side terminals are connected to bus bars (connecting members in JP 2013-37988A1) that connect a plurality of battery cells constituting the secondary battery to each other.

JP 2013-37988A is an example of related art.

SUMMARY OF THE INVENTION

Meanwhile, in the battery wiring module, it is conceivable to arrange the electric wires so as to overlap on the module-side terminals for the relationship of the layout in the housing, and miniaturization of the housing itself. However, in the case where the electric wires are arranged so as to overlap on the module-side terminals, the module-side terminals may damage the electric wires.

The present invention has been made to solve the above issues, and an object thereof is to provide a battery wiring module that can reduce the damage to the electric wires.

A battery wiring module that solves the above issues includes: a module-side terminal electrically connected to a bus bar connecting battery terminals of a plurality of battery cells; an electric wire with one end side to which the module-side terminal is connected; and a housing for accommodating the electric wire and the module-side terminal, wherein the housing has a terminal accommodating portion for accommodating the module-side terminal, and the battery wiring module includes a partition wall portion that separates the module-side terminal and the electric wire in a state where the module-side terminal is interposed between the partition wall portion and a bottom portion of the terminal accommodating portion.

According to the above aspect, the module-side terminal and the electric wires can be separated by the partition wall portion, and thus the damage to the electric wires due to the module-side terminal can be reduced.

In the above battery wiring module, it is preferable that the terminal accommodating portion includes an opening portion that is open to the bus bar side, and the battery wiring module has a closed wall portion that closes a part of the opening portion.

According to the above aspect, by having the closed wall portion that closes a part of the opening portion, it is possible to reduce spatter flying to the electric wire side at the time of connecting the bus bar and the module-side terminal, for example, by welding.

In the above battery wiring module, it is preferable that the partition wall portion and the closed wall portion are formed integrally.

According to the above aspect, because the partition wall portion and the closed wall portion are formed integrally, an increase in the number of parts can be suppressed.

In the above battery wiring module, it is preferable that the partition wall portion has an insulating property.

According to the above aspect, the partition wall portion having an insulating property can prevent conduction between the core wires and the module-side terminal even when the core wires are exposed.

In the above battery wiring module, it is preferable that the partition wall portion has a rattling reduction portion that reduces rattling, on a lower surface side that is the bottom portion side of the terminal accommodating portion.

According to the above aspect, because the partition wall portion has the rattling reduction portion that reduces rattling on the lower surface side that is the bottom portion side of the terminal accommodating portion, it is possible to sufficiently ensure the accommodation space of the electric wires located on the upper surface side while reducing rattling.

In the above battery wiring module, it is preferable that the partition wall portion is provided, in the housing, at an outlet through which the electric wire is drawn to the outside.

According to the above aspect, by providing the partition wall portion at the outlet through which the electric wires are drawn to the outside, that is, by providing the partition wall portion at the outlet at which the plurality of electric wires are gathered, it is possible to prevent the plurality of electric wires from being damaged by the module-side terminal.

According to the battery wiring module of the present invention, damage to the electric wires can be suppressed.

EMBODIMENTS OF THE INVENTION

Figure 1:
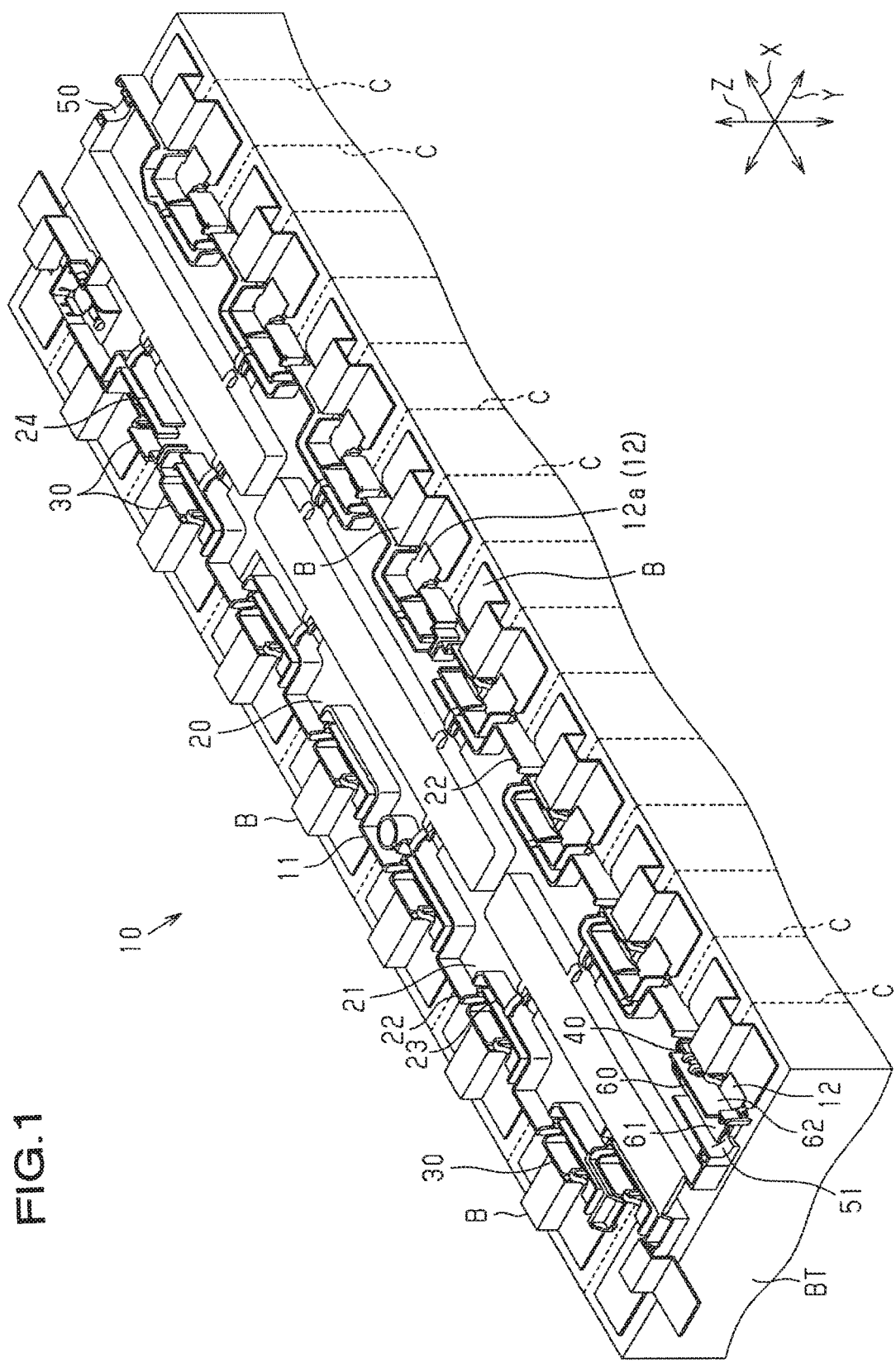
FIG. 1 is a perspective view of a battery wiring module in an embodiment.

Hereinafter, an embodiment of a battery wiring module will be described. In the drawings, for convenience of explanation, parts of the configuration may be shown exaggerated or simplified. Also, the dimensional proportions of the parts may be different from the actual dimensional proportions.

As shown in FIG. 1, a battery wiring module 10 is mounted on the upper surface of an approximately cuboid-shaped secondary battery BT. Note that the secondary battery BT is installed in an electric automobile, a hybrid automobile, or the like, and supplies electric power to a vehicle travel motor. Furthermore, the secondary battery BT is supplied with electric power from the travel motor or a power generation motor depending on charge conditions or vehicle driving conditions. Here, in the following description, among three directions X, Y, and Z in FIG. 1 that are orthogonal to each other, the X direction is a direction in which battery cells are aligned, the Y direction is a width direction of the battery wiring module, and the Z direction is a vertical direction.

The secondary battery BT includes a plurality of battery cells C, and cathode terminals and anode terminals (not shown) of the battery cells C are arranged on the battery wiring module 10 side (upper side).

The plurality of battery cells C are aligned in the X direction. At this time, the battery cells C are aligned such that their cathode terminals and anode terminals, which serve as battery terminals, are arranged alternatingly in the direction in which the battery cells C are aligned, that is, in the X direction. Bus bars B are provided for these terminals, each bus bar being configured to connect adjacent terminals, that is, a cathode terminal and an anode terminal. In other words, the battery cells C are connected in series by the bus bars B. The bus bars B of the present embodiment are connected to the positive electrodes and the negative electrodes of the battery cells C by welding, for example.

Figure 2:
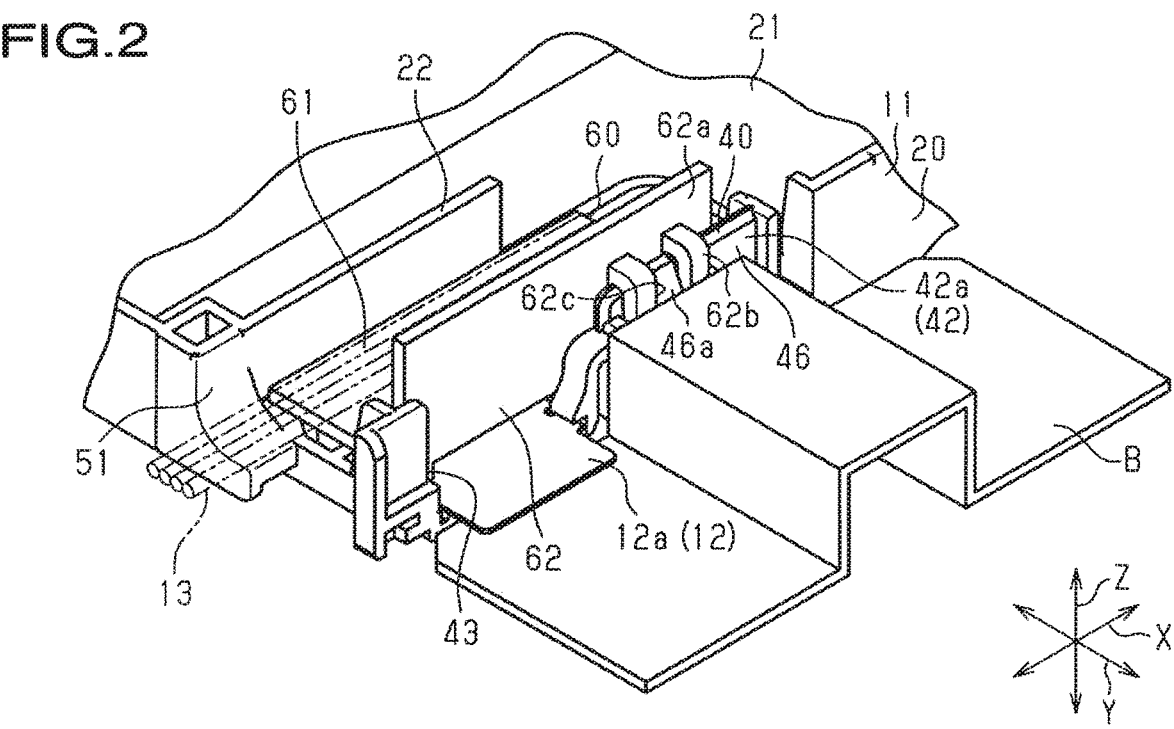
FIG. 2 is a perspective view showing a part of the battery wiring module in the embodiment.
Figure 3:
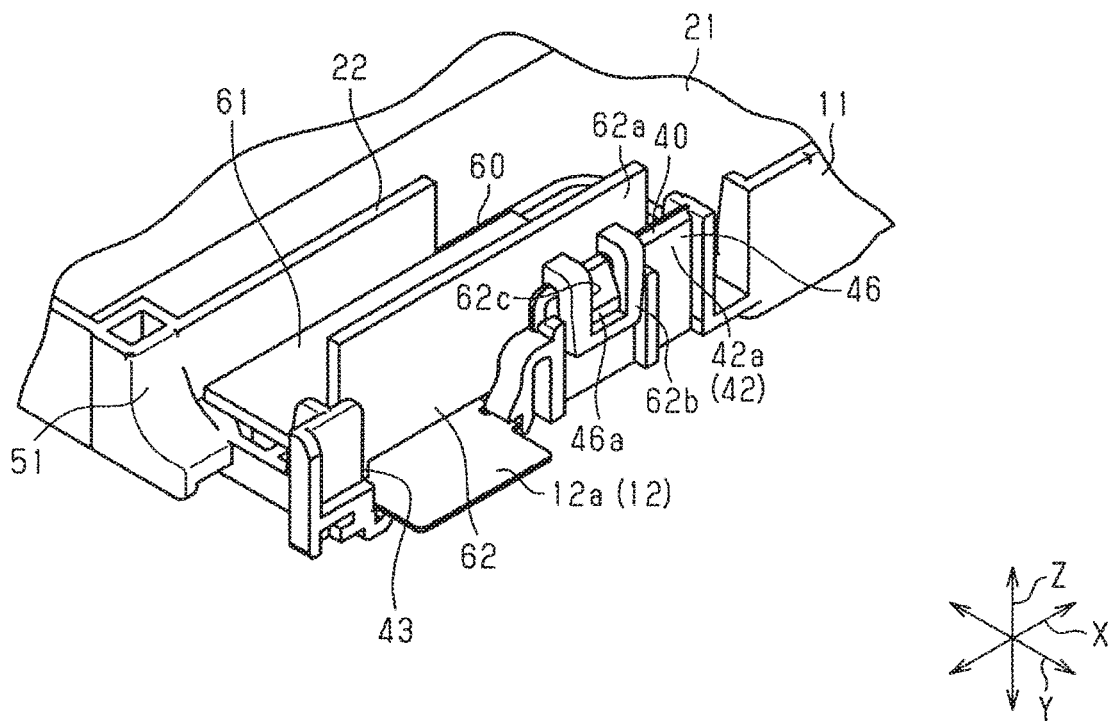
FIG. 3 is a perspective view showing a state in which a bus bar of the battery wiring module in the embodiment has been removed.
Figure 6:
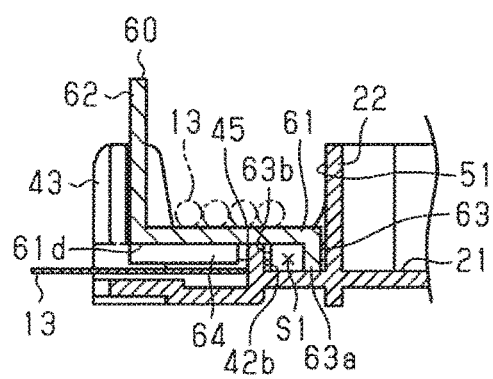
FIG. 6 is a cross-sectional view taken along line 6-6 of FIG. 5.
Figure 6:
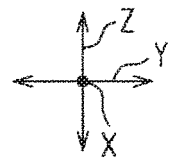
Figure 9:
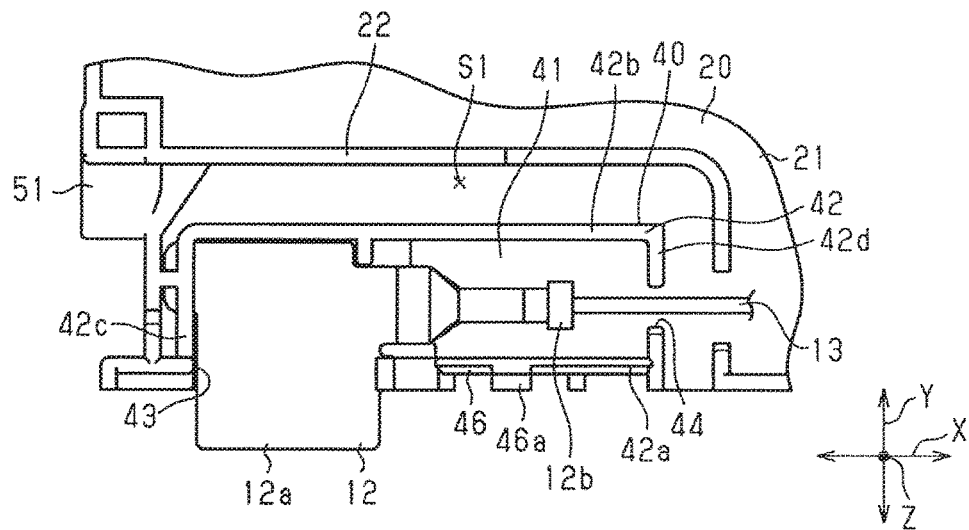
FIG. 9 is a plan view showing a state in which the cover portion of the battery wiring module in the embodiment has been removed.

As shown in FIG. 1, the battery wiring module 10 includes a housing 11, a plurality of module-side terminals 12, and a plurality of electric wires 13 (see FIGS. 2, 6, and 9).

The housing 11 has a shape such that, for example, the size in the X direction, which is the direction in which the battery cells C are aligned, is greater than the size in the Y direction, which is the width direction. The upper side of the housing 11 is open, and the opening is designed to be closed by a cover (not shown).

The housing 11 is made of, for example, a resin member. The housing 11 includes electric wire accommodating portions 20 that accommodate the electric wires 13, and terminal accommodating portions 30 and 40 that accommodate module-side terminals 12.

Figure 4:
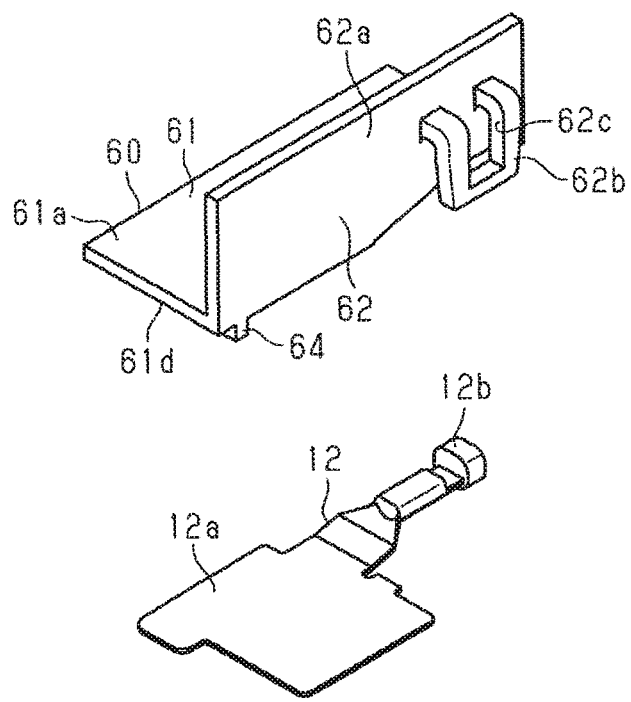
FIG. 4 is an exploded perspective view showing a part of the battery wiring module in the embodiment.

As shown in FIG. 4, each module-side terminal 12 has a flat plate-shaped terminal body 12a, and a barrel portion 12b that is contiguous from the terminal body 12a. The barrel portion 12b is electrically connected to a core wire of an electric wire 13. Also, the module-side terminal 12 of this example is configured such that the terminal body 12a protrudes in the Y direction to form a substantial L shape with respect to the X direction, which is the longitudinal direction of the approximately cylindrical barrel portion 12b.

As show in FIG. 1, the electric wire accommodating portions 20 of the housing 11 are segments of the housing 11, which are formed by a bottom portion 21 and side walls 22 that extend from the outer edge portions of the bottom portion 21. The electric wire accommodating portions 20 include a plurality of recess portions 23 and 24 arranged in the direction in which the plurality of battery cells C are aligned, the plurality of recess portions 23 and 24 being recessed in the direction that is orthogonal to the direction in which the plurality of battery cells C are aligned, and that is orthogonal to the direction in which the housing 11 is stacked on the battery cells C, that is, the plurality of recess portions 23 and 24 are recessed in the width direction Y. Each recess portion 23 is provided with one terminal accommodating portion 30. Each recess portion 24 is provided with two terminal accommodating portions 30.

As shown in FIG. 1, the terminal accommodating portions 30 of the housing 11 accommodated in the recess portions 23 and 24 each have an approximately cuboid shape elongated in the X direction.

As shown in FIGS. 1 and 2, the electric wires 13 respectively connected to the module-side terminals 12 are drawn out from outlets 50 and 51 respectively provided at both ends of the housing 11 in the X direction. That is, in the housing 11 of this example, the outlets 50 and 51 are respectively provided at both ends in the X direction. The outlets 50 and 51 are open in the X direction. The electric wires 13 respectively connected to the module-side terminals 12 are drawn from the outlets 50 and 51, and are connected to voltage monitoring ECUs (not shown).

Also, the terminal accommodating portion 40 is provided in the vicinity of the one outlet 51 of the two outlets 50 and 51. At this time, the terminal accommodating portion 40 overlaps with the electric wires 13 drawn from the outlet 51 in the Z direction.

As shown in FIG. 4, similarly to the terminal accommodating portions 30, the terminal accommodating portions 40 each have a bottom portion 41, and a side wall 42 that extends from the outer edge portion of the bottom portion 41.

As shown in FIGS. 4 and 9, the side wall 42 has a first wall portion 42a, a second wall portion 42b, a third wall portion 42c, and a fourth wall portion 42d.

The first wall portion 42a and the second wall portion 42b face each other in the Y direction. The first wall portion 42a is located outside relative to the second wall portion 42b in the Y direction. The length of the first wall portion 42a in the X direction is shorter than that of the second wall portion 42b. The third wall portion 42c extends in the Y direction from the end portion on one side in the X direction of the second wall portion 42b, and faces in the X direction. The fourth wall portion 42d is located at the end portion on the other side in the X direction of the second wall portion 42b, and opposes the third wall portion 42c in the X direction. The second wall portion 42b, the third wall portion 42c, and the fourth wall portion 42d of this example each have a length of extension from the bottom portion 41 in the Z direction shorter than that of the first wall portion 42a. That is, the second wall portion 42b, the third wall portion 42c, and the fourth wall portion 42d are lower in height than the first wall portion 42a. The upper end portions of the second wall portion 42b, the third wall portion 42c, and the fourth wall portion 42d of this example are substantially flush. At this time, the extension lengths (heights) of the second wall portion 42b and the third wall portion 42c in the Z direction are heights at which it is possible to come in contact with the module-side terminal 12 in the X direction or the Y direction, in a state where the module-side terminal 12 is mounted (accommodated) in the terminal accommodating portion 40.

An opening portion 43 is provided between the first wall portion 42a and the third wall portion 42c. The opening portion 43 is open in the Y direction, and a part of the terminal body 12a of the module-side terminal 12 can be exposed to the outside in the Y direction. Also, the fourth wall portion 42d has an opening portion 44 that is open in the X direction. The opening portion 44 can guide the electric wire 13 toward the electric wire accommodating portion 20.

Figure 5:
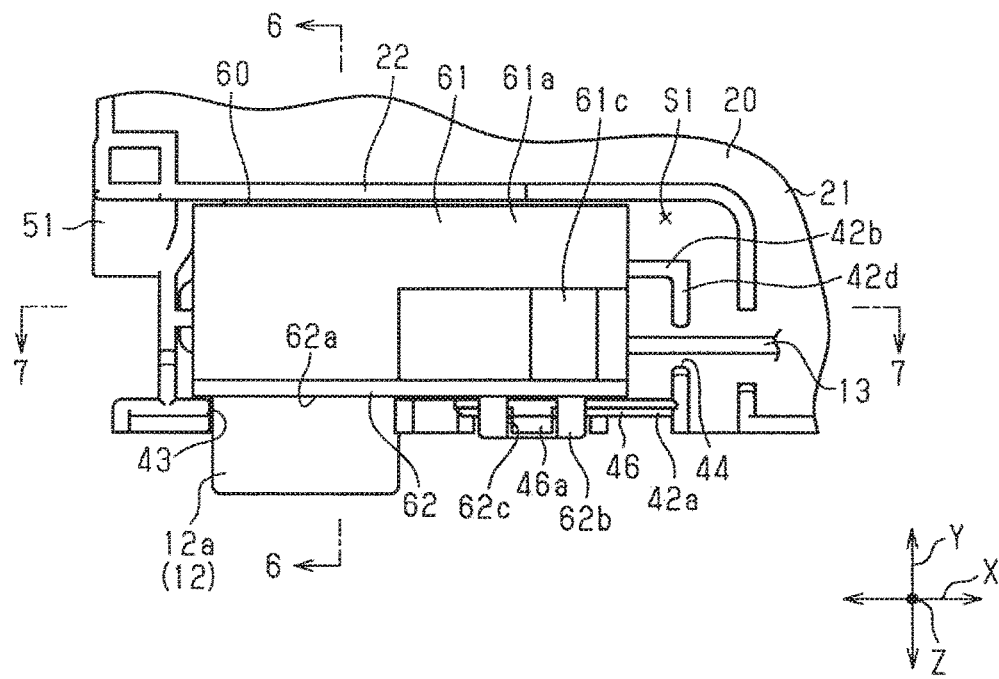
FIG. 5 is a plan view showing a part of the battery wiring module in the embodiment.

As shown in FIGS. 4 to 6, a space S1 is provided between the second wall portion 42b and the side wall 22 of the electric wire accommodating portion 20.

As shown in FIGS. 1 to 7, the terminal accommodating portion 40 on the outlet 51 side is provided with a cover portion 60 so as to cover the upper side, in a state where the module-side terminal 12 is accommodated therein.

The cover portion 60 has a partition wall portion 61 and a closed wall portion 62. The partition wall portion 61 and the closed wall portion 62 are formed integrally. The cover portion 60 is made of, for example, a resin member. That is, the partition wall portion 61 and the closed wall portion 62 of the cover portion 60 have insulation.

The partition wall portion 61 has an approximately rectangular plate shape. The partition wall portion 61 of this example has a flat portion 61a, a recess portion 61b recessed in the Z direction relative to the flat portion 61a, and a protruding portion 61c at a position in the Z direction corresponding to the recess portion 61b.

As shown in FIGS. 2 and 6, the partition wall portion 61 is provided so as to conceal the module-side terminal 12 accommodated in the terminal accommodating portion 40, and separates the module-side terminal 12 and the electric wires 13 passing above that module-side terminal 12. At this time, the partition wall portion 61 is in a state in which the module-side terminal 12 is interposed between the partition wall portion 61 and the bottom portion 41 of the terminal accommodating portion 40.

Figure 7:
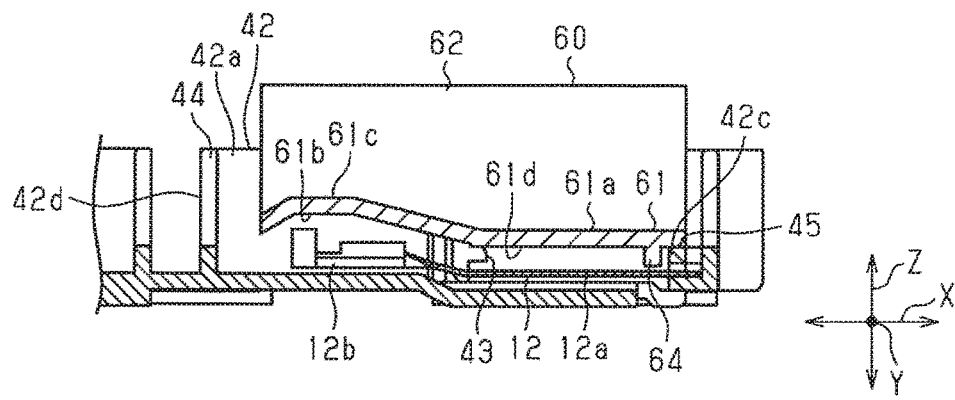
FIG. 7 is a cross-sectional view taken along line 7-7 of FIG. 5.

As shown in FIGS. 6 and 7, in the partition wall portion 61 of the cover portion 60, the lower surface 61d facing the module-side terminal 12 in the Z direction comes into contact with the upper end portions 45 of the second wall portion 42b and the third wall portion 42c. At this time, the partition wall portion 61 has a length (width) in the Y direction longer than a length in the Y direction of the terminal accommodating portion 40. That is, the partition wall portion 61 protrudes in the Y direction more than the second wall portion 42b in a state where the cover portion 60 is attached to the terminal accommodating portion 40.

As shown in FIG. 7, the recess portion 61b is formed at a position corresponding to the barrel portion 12b of the module-side terminal 12. With this configuration, interference between the barrel portion 12b and the cover portion 60 (the partition wall portion 61) is suppressed. Also, by providing the recess portion 61b only at the position corresponding to the barrel portion 12b of the module-side terminal 12, narrowing of the accommodation space for drawing the electric wire 13 toward the outlet 51 by the protruding portion 61c can be suppressed.

Figure 8:
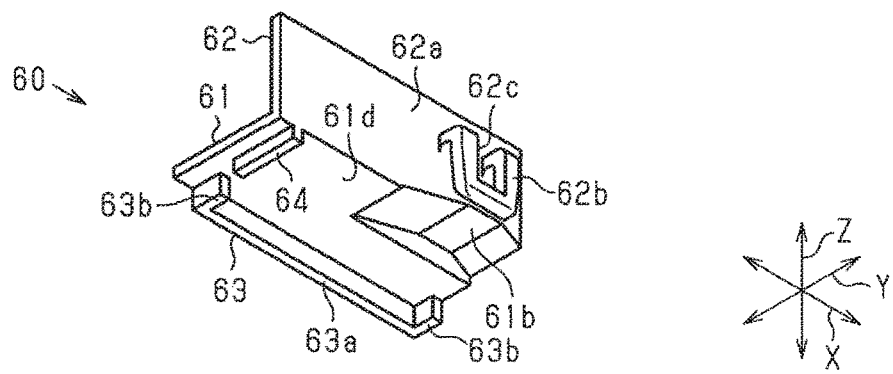
FIG. 8 is a perspective view of a cover portion.

As shown in FIGS. 6 to 8, the partition wall portion 61 has a first extended portion 63 and a second extended portion 64 in a direction away from a lower surface 61d (downward direction) in the Z direction from the lower surface 61d.

The first extended portion 63 has an extension length from the lower surface 61d longer than the extension length of the second extended portion 64. That is, the leading end portion of the first extended portion 63 is located below the leading end portion of the second extended portion 64.

The first extended portion 63 is provided on the side wall 22 side of the electric wire accommodating portion 20, which opposes the second wall portion 42b in the Y direction relative to the second wall portion 42b in the Y direction. More specifically, the first extended portion 63 extends in the Z direction from the end portion in the Y direction of the partition wall portion 61. At this time, the first extended portion 63 is arranged in the space S1. The first extended portion 63 has a first extended wall portion 63a extending in the X direction, and a pair of second extended wall portions 63b respectively extending in the Y direction from both sides in the X direction of the first extended wall portion 63a. The first extended wall portion 63a can come in contact with the side wall 22 of the electric wire accommodating portion 20 on one side (inner side) in the Y direction. The second extended wall portions 63b can come in contact with the second wall portion 42b on the other side (outer side) in the Y direction. That is, the first extended wall portion 63a and the second extended wall portions 63b function as rattling reduction portions that reduce rattling of the cover portion 60 (the partition wall portion 61) by coming into contact in the Y direction.

The second extended portion 64 is formed on the third wall portion 42c side in the X direction. With this configuration, for example, even when the partition wall portion 61 moves in the direction (upward direction) away from the module-side terminal 12 in the Z direction, the second extended portion 64 can shield the module-side terminal 12 from the outside.

The closed wall portion 62 extends in a direction (upward) away from the module-side terminal 12 from the outer end portion in the Y direction of the partition wall portion 61 in the Z direction.

In the closed wall portion 62, a locking portion 62b is formed on the outer side surface 62a on the outer side in the Y direction. The locking portion 62b has a substantially U-shaped frame shape, has an engagement hole at the center thereof, and can be engaged with a projection 46a formed on the outer side surface 46 of the first wall portion 42a. With this configuration, the cover portion 60 is fixed to the housing 11 (the terminal accommodating portion 40). At this time, the closed wall portion 62 closes most of the opening portion 43 that exposes a part of the module-side terminal 12. With this configuration, when welding the bus bar B and the module-side terminal 12, spatter is prevented from flying to the electric wires 13 above the partition wall portion 61.

The action of the present embodiment will be described.

The battery wiring module 10 of the present embodiment is arranged on the secondary battery BT, which has the plurality of battery cells C. The module-side terminals 12 of the battery wiring module 10 are connected to the bus bars B connecting the cathode terminals and anode terminals of the battery cells C arranged in the X direction. The ends on one side of the electric wires 13 are connected to the module-side terminals 12, and the ends on the other side of the electric wires 13 are connected to battery monitoring ECUs (not shown). The battery monitoring ECUs can monitor the voltages of the battery cells C.

Also, in the battery wiring module 10, the partition wall portion 61 of the cover portion 60 is provided on the side of the outlet 51 located on one side in the X direction, whereby the electric wires 13 drawn from the outlet 51 and the module-side terminal 12 accommodated in the terminal accommodating portion 40 on the outlet 51 side are separated.

The effects of the present embodiment will be described.

(1) Because the module-side terminal 12 and the electric wires 13 can be separated by the partition wall portion 61, damage to the electric wires 13 by the module-side terminal 12 can be reduced.

(2) By providing the closed wall portion 62 that closes a part of the opening portion 43 that exposes the module-side terminal 12 to the outside, spatter that is generated when connecting the bus bars B and the module-side terminals 12, for example, by welding can be suppressed from flying to the electric wires 13.

(3) Because the partition wall portion 61 and the closed wall portion 62 are formed integrally, an increase in the number of the parts can be suppressed.

(4) Because the partition wall portion 61 has an insulating property, conduction between the core wires of the electric wires 13 and the module-side terminal 12 can be prevented even when the core wires are exposed.

(5) Because the partition wall portion 61 has the first extended portion 63 serving as the rattling reduction portion that reduces rattling on the lower surface 61d side, which is the bottom portion 41 side of the terminal accommodating portion 40, it is possible to ensure the accommodation space for the electric wires 13 located on the upper surface side while reducing the rattling.

(6) By providing the partition wall portion 61 at the outlet 51 through which the electric wires are drawn to the outside, that is, by providing the partition wall portion 61 at the outlet 51 where the plurality of electric wires are gathered, damage to the plurality of electric wires 13 by the module-side terminal 12 can be suppressed.

Note that the above embodiment can be implemented with the following modifications. The above embodiment and the following modifications can be implemented in combination with one another as long as there is no technical contradiction.

In the above embodiment, the closed wall portion 62 is provided, but the closed wall portion 62 may also be omitted.

In the above embodiment, the partition wall portion 61 is made of an insulating resin member, but the partition wall portion 61 may also be made of a non-insulating member.

In the above embodiment, the first extended portion 63 is provided on the lower surface 61d of the partition wall portion 61, but the position at which the first extended portion is provided may also be changed as appropriate.

In the above embodiment, the partition wall portion 61 is provided at the outlet 51, but the partition wall portion 61 may also be provided at another position where the electric wires 13 and the module-side terminal 12 overlap (particularly, in the gravity direction).

In the above embodiment, the partition wall portion 61 and the closed wall portion 62 are formed integrally, but the partition wall portion and the closed wall portion may also be formed separately.

In the above embodiment, the cover portion 60 and the housing 11 (the terminal accommodating portion 40) are formed separately, but the cover portion and the housing may also be formed integrally. As one example, it is conceivable to connect the cover portion and the housing by a hinge portion.

LIST OF REFERENCE NUMERALS

10: Battery wiring module
11: Housing
12: Module-side terminal
13: Electric wire
40: Terminal accommodating portion
41: Bottom portion
43: Opening portion
50, 51: Outlet
60: Cover portion
61: Partition wall portion
62: Closed wall portion
63: First extended portion (rattling reduction portion)
B: Bus bar
C: Battery cell

What is claimed is:

1. A battery wiring module comprising:
a module-side terminal electrically connected to a bus bar connecting battery terminals of a plurality of battery cells;
an electric wire with one end side to which the module-side terminal is connected; and
a housing configured to accommodate the electric wire and the module-side terminal,
wherein the housing includes a terminal accommodating portion configured to accommodate the module-side terminal,
the terminal accommodating portion includes a bottom wall and a side wall extending upwards from the bottom wall,
the battery wiring module further includes a partition wall portion that has a plate shape,
the partition wall portion extends over a space outside the terminal accommodating portion and the terminal accommodating portion such that a main surface of the partition wall portion faces the bottom wall, and
the partition wall portion separates the module-side terminal and the electric wire passing above the partition wall portion, in a condition in which the module-side terminal is interposed between the main surface of the partition wall portion and the bottom wall of the terminal accommodating portion.

2. The battery wiring module according to claim 1,
wherein the side wall of the terminal accommodating portion includes an opening portion that is open to the bus bar side, and
the battery wiring module has a closed wall portion that entirely closes the opening portion at an upper end of the side wall.

3. The battery wiring module according to claim 2,
wherein the partition wall portion and the closed wall portion are formed integrally.

4. The battery wiring module according to claim 1,
wherein the partition wall portion has an insulating property.

5. The battery wiring module according to claim 1, wherein
the side wall of the terminal accommodating portion includes a side wall portion that extends in a first direction,
the battery wiring module further includes a wire side wall that extends in parallel with the side wall portion of the terminal accommodating portion,
the space is provided between the side wall portion and the wire side wall,
the partition wall portion includes a rattling reduction portion, the rattling reduction portion including:
a first extended wall portion provided on a lower surface of the partition wall portion and extending in the first direction, the lower surface being a surface on the bottom wall side of the terminal accommodating portion, and
a second extended wall portion provided on the lower surface of the partition wall portion and extending from an end of the first extended wall portion in a second direction perpendicular to the first direction,
the first extended wall portion and the second extended wall portion are accommodated in the space such that the first extended wall portion contacts the wire side wall and the second extended wall portion contacts the side wall portion of the terminal accommodating portion.

6. The battery wiring module according to claim 1, wherein the partition wall portion is provided, in the housing, at an outlet through which the electric wire is drawn to the outside.

7. The battery wiring module according to claim 1, wherein the main surface of the partition wall portion is provided on and contacts an upper end of the side wall.

* * * * *